United States Patent
Mitsuma et al.

(10) Patent No.: US 10,831,624 B2
(45) Date of Patent: Nov. 10, 2020

(54) SYNCHRONIZING DATA WRITES

(71) Applicant: International Business Machines Corporation, Armonk, NY (US)

(72) Inventors: Shinsuke Mitsuma, Machida (JP); Tohru Hasegawa, Tokyo (JP); Hiroshi Itagaki, Yokohama (JP); Tsuyoshi Miyamura, Yokohama (JP); Noriko Yamamoto, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 16/374,830

(22) Filed: Apr. 4, 2019

(65) Prior Publication Data

US 2020/0319985 A1    Oct. 8, 2020

(51) Int. Cl.
| | |
|---|---|
| *G06F 12/00* | (2006.01) |
| *G06F 11/20* | (2006.01) |
| *G06F 12/0891* | (2016.01) |
| *G06F 3/06* | (2006.01) |

(52) U.S. Cl.
CPC ........ *G06F 11/2082* (2013.01); *G06F 3/0604* (2013.01); *G06F 3/0665* (2013.01); *G06F 3/0676* (2013.01); *G06F 12/0891* (2013.01)

(58) Field of Classification Search
CPC .. G06F 11/2082; G06F 3/0604; G06F 3/0665; G06F 3/0676; G06F 12/0891
See application file for complete search history.

(56) References Cited

U.S. PATENT DOCUMENTS

| | | | |
|---|---|---|---|
| 7,620,765 B1 * | 11/2009 | Ohr | G06F 11/1448 711/162 |
| 9,092,149 B2 | 7/2015 | Green et al. | |
| 9,170,740 B2 | 10/2015 | Zwisler et al. | |
| 10,168,920 B2 | 1/2019 | Abe et al. | |
| 2011/0320679 A1 | 12/2011 | Ashton et al. | |
| 2012/0036321 A1 * | 2/2012 | Zwisler | G06F 3/064 711/114 |
| 2014/0289464 A1 * | 9/2014 | Gonzalez | G06F 3/0619 711/114 |
| 2016/0196081 A1 * | 7/2016 | Carlson | G11B 20/00086 713/193 |
| 2016/0224254 A1 | 8/2016 | Akirav et al. | |
| 2017/0052718 A1 | 2/2017 | Abe et al. | |

OTHER PUBLICATIONS

Mitsuma et al., "Tape Image Reclaim in Hierarchical Storage Systems", U.S. Appl. No. 16/050,225, filed Jul. 31, 2018.

* cited by examiner

*Primary Examiner* — John A Lane
(74) *Attorney, Agent, or Firm* — James L. Olsen (57) ABSTRACT

Aspects of the present disclosure relate to synchronizing data writes. An update to a file stored on a virtual tape image is received. A position and length of the file is recorded as an invalid data area. The virtual tape image is then synchronized with a tape. The invalid data area is then released from the virtual tape image.

20 Claims, 6 Drawing Sheets

SYNCHRONIZING DATA WRITES

BACKGROUND

The present disclosure relates generally to the field of storage systems in computing environments.

Data fragmentation refers to the fragmentation of long, contiguous regions of memory on a storage device, such as a tape drive or hard disk drive, into shorter contiguous regions of memory over time. Data fragmentation occurs when a collection of data, such as files in a file system, are broken up into many non-contiguous regions on a storage device. This stems from the fact that in a file system, files are usually managed and allocated to memory in chunks or blocks of data of fixed size. When a file system is initially created, there is ample free space to store file blocks together contiguously. However, as files are added, removed, and changed in size, the free space becomes fragmented, leaving only small contiguous regions of memory to store new data. Accordingly, when a new file is written, or an existing file is extended, the operating system attempts to store the data in new non-contiguous data blocks to best utilize the remaining free memory on the storage device.

The linear tape file system (LTFS) is a file system that allows files stored on tape cartridges in a tape library to be accessed in a similar fashion as files stored on a hard disk or flash drive. The LTFS requires both a specific format of data on the tape media and software to provide a file system interface to the data. Each LTFS formatted tape cartridge in the library appears as a separate folder under the filesystem mount point. Applying a file system to a tape drive allows users to organize and search the contents of tape media as they would on a hard disk, thereby improving access time for data stored on tape media.

SUMMARY

Aspects of the present disclosure relate to a method, system, and computer program product for synchronizing data writes. An update to a file stored on a virtual tape image can be received. A position and length of the file can be recorded as an invalid data area. The virtual tape image can then be synchronized with a tape. The invalid data area can then be released from the virtual tape image.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

FIG. 2A is a block diagram illustrating an example tape media, in accordance with embodiments of the present disclosure.

FIG. 2B is a block diagram illustrating another example tape media, in accordance with embodiments of the present disclosure

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the disclosure.

DETAILED DESCRIPTION

Aspects of the present disclosure relate generally to the field of storage systems in computing environments. While the present disclosure is not necessarily limited to such applications, various aspects of the disclosure may be appreciated through a discussion of various examples using this context.

The Linear Tape File System (LTFS) is a file system that allows access to files stored on a tape medium in a similar fashion to files stored on a disk (e.g., Hard Disk Drive (HDD)) or flash memory (e.g., a NAND Storage Universal Serial Bus (USB) Memory Device). The LTFS enables data access (e.g., read/write access) to a file stored on the tape medium directly from a file-based application without using a dedicated application for the tape drive. The LTFS is formatted in accordance with an open specification defined by the International Organization for Standardization (ISO). The ISO defined LTFS format specification includes two partitions: an index partition (IP) and a data partition (DP). The index partition records indices (e.g., metadata or index information) for respective files and the data partition records the files as well as respective indices.

Embodiments of the present disclosure recognize that while data stored in a LTFS appears to behave like data stored on a hard disk, the fundamental sequential nature of writing data to magnetic tape media remains. Files are always appended to the end of the tape media (e.g., the end of the previous record prior to the EOD position on a tape). Furthermore, a LTFS is a write-once file system. In other words, if a file stored on one or more data blocks is modified, overwritten, or removed from a tape image, the associated data blocks are not freed up. Rather, the memory allocated to the associated data blocks becomes invalid (i.e., the associated data blocks are no longer referenced in the index).

Aspects of the present disclosure recognize several deficiencies with current LTFS technologies. LTFS's incur data fragmentation. Consequences of data fragmentation include the failure of an application or system due to premature resource exhaustion (e.g. data is required to be stored as a contiguous block of data and cannot be stored as such). This can occur if a storage device has enough free memory to store the data, but the free memory is fragmented into segments that are too small to store a contiguous piece of data.

Data fragmentation also results in computing performance degradation. Data fragmentation increases the amount of computing resources required to allocate and access a resource. For example, on a hard disk or tape drive, sequential data reads are fast, but seeking to a different address is slow. Thus, reading or writing a fragmented file requires numerous seeks, which results in slowing access to data due to seek time and rotational latency of the read/write head.

Typically, data fragmentation occurs when a collection of logically related data is broken up into many, non-contiguous regions on a storage device. In a LTFS, data fragmentation results from the fact those data blocks that include data that is modified, overwritten, or deleted become invalid. The result is that, although free storage space is available, it is essentially unusable since invalid data blocks are not referenced in a LTFS formatted tape image index partition. This is problematic for data that is modified, overwritten, or newly added, since data that is modified, overwritten, or newly added will be written as separate, smaller non-contiguous blocks at the end of the tape media.

Furthermore, data fragmentation is particularly problematic in a LTFS since reformatting of a storage device (e.g., tape media or hard disk) is generally performed after a large number of data blocks have been invalidated. This stems from the fact that in order to validate the memory capacity of invalid data blocks, the entire storage device (e.g., tape media or hard disk) must be reformatted. This process is known as a tape image reclaim. A tape image reclaim frees up storage space that is occupied by file data that is not referenced (i.e., invalid files) in an index partition of a tape image stored on a storage device. This is accomplished by copying file data that is referenced (i.e., valid files) in an index partition of a tape image stored on a first storage device and writing the valid files onto a second storage device. Once the valid files have been transferred to a second, new storage device, the first storage device is reformatted.

Embodiments further recognize that an LTFS can also be implemented with storage devices other than tape drives, such as hard disk drives and flash drives by adding a tape drive emulation component, such as a virtual tape library (VTL). A VTL is a data storage virtualization technology that utilizes a storage component (usually hard disk storage) as tape libraries or tape drives for use with existing backup software. Virtualizing the disk storage as tape allows integration of VTLs with existing backup software and existing backup and recovery processes and policies. In essence, a VTL writes data such that the data appears to be stored entirely on tape media when the data is actually located on faster storage devices, such as hard disk drives (HDDs) and solid-state drives (SSDs). A VTL can be thought of as a disk array that mimics tape. To servers, the VTL appears to be a tape library and the data backup software writes to it and manages it as if it were tape. However, because a VTL is actually disk-based, it is much faster than tape to read and write. The benefits of such virtualization include storage consolidation and faster data restore processes. Furthermore, by backing up data to disks instead of tapes, a VTL often increases performance of both backup and recovery operations.

Embodiments of the present disclosure recognize several deficiencies when a LTFS is implemented in a hierarchical storage environment. For example, if a LTFS is implemented with a VTL and a traditional tape drive, emulation software redirects write requests directed toward a tape drive to a hard disk. However, since the data is written to the hard disk as a LTFS formatted file, even if data corresponding to the file is modified or deleted, space is not freed up on the hard disk, but rather invalidated (i.e., not referenced by the index partition of a tape image). Thus, when a large number of data areas on the hard disk become invalid, a reclaim process needs to be executed. Generally, in order to perform a reclaim process, valid files referenced by the index partition of a tape image stored on a first hard disk are copied and transferred to a second hard disk on a per LTFS file basis. Once the valid files have been transferred to a second, new hard disk, the first hard disk is reformatted. Here, the reclaim source is a tape image stored on the existing hard disk and the reclaim target is a second tape image stored on the new hard disk. However, this process is disadvantageous since an additional hard disk is tied up in order to perform the reclaim process.

In some instances, the same data stored on a hard disk is also stored on tape media as a backup. To perform a reclaim process in these cases, valid files stored on the tape media are copied and transferred to a hard disk on a per LTFS file basis. However, this process can take a long time and requires an increased amount of computing resources if a large number of tape seek operations are required due to severe fragmentation of the file storage area of the tape media.

Embodiments of the present disclosure recognize several further deficiencies when a LTFS is implemented in a hierarchical storage environment. For example, in some instances, data written as a LTFS formatted file can be mirrored between a hard disk and tape media. Again, since the data is written to the hard disk as a LTSF formatted file, even if data is deleted on a hard disk, space is not freed up on the hard disk, but rather invalidated. Thus, when a large number of data areas on the hard disk become invalid, a reclaim process may need to be executed. To perform a reclaim process for data that is mirrored between a hard disk and tape media, valid files referenced by an index partition of a tape image stored on the hard disk can either (i) be copied and transferred to a second hard disk on a per LTFS file basis and the first hard disk drive reformatted once all valid files have been transferred, or (ii) reformat the existing hard disk and copy and transfer all valid files from the mirrored tape media to a reformatted hard disk on a per LTFS file basis. However, the first reclaim process is disadvantageous since an additional hard disk is tied up to perform the reclaim process. Similarly, the second reclaim process is disadvantageous as the reclaim process can take a long time and require an increased amount of computing resources if a large number of tape seek operations are required due to severe fragmentation of the file storage area of the tape media.

Aspects of the present disclosure address the aforementioned complications by allowing data to be freed up (e.g., released) within a storage array (e.g., one or more hard disks, solid state drives, flash storage devices, etc.) by recording invalid areas within the storage array after files are updated. Synchronization can occur between a virtual tape image (e.g., stored on an HDD) and a tape. After synchronization occurs, the recorded invalid areas can be released on the storage device (e.g., of the storage array) containing the virtual tape image.

Figure 1:
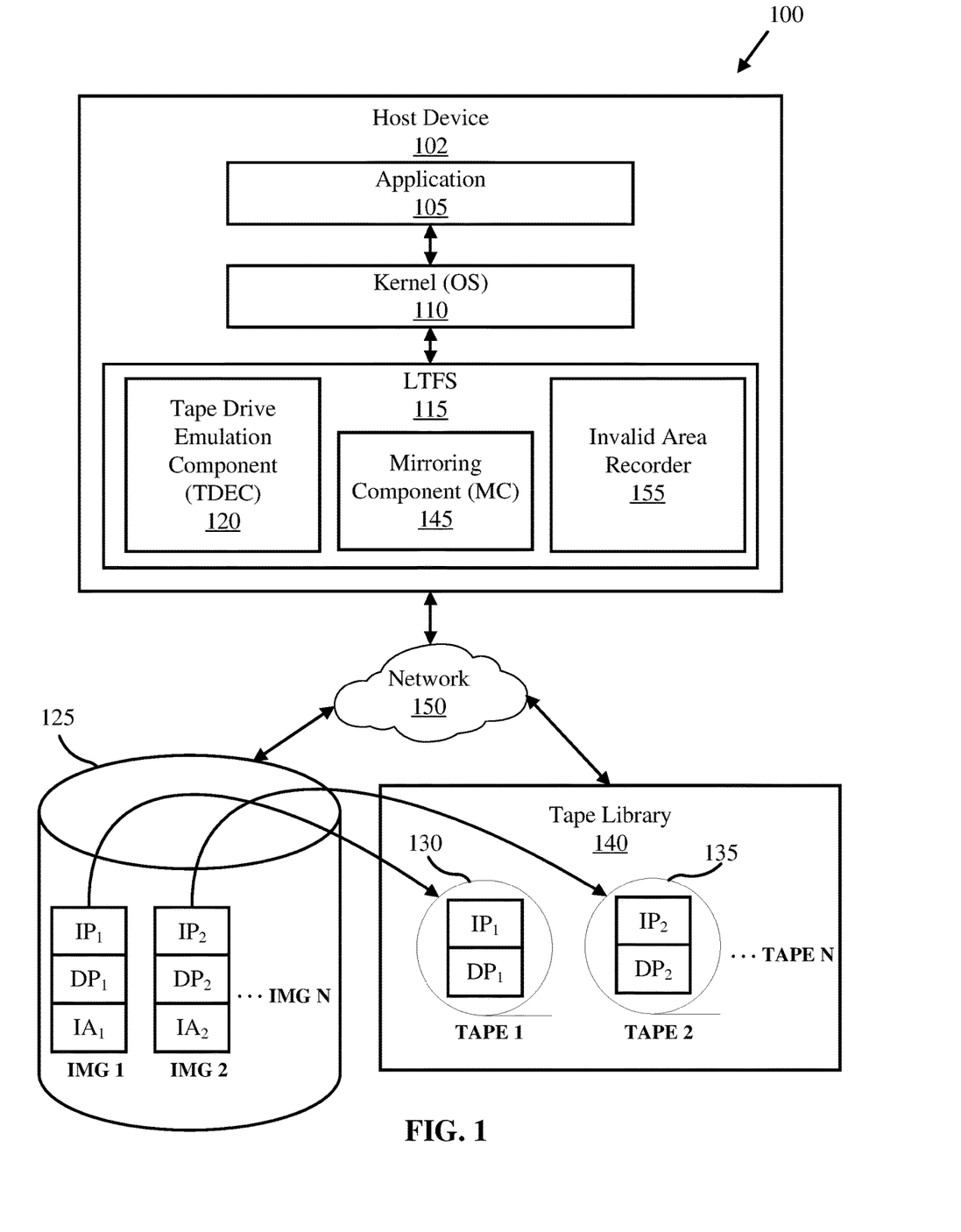
FIG. 1 is a block diagram of an example computing environment in which illustrative embodiments can be implemented.

Referring now to the Figures, FIG. 1 is a block diagram of a computing environment 100 in which illustrative embodiments of the present disclosure may be implemented.

Computing environment 100 includes a host device 102, a storage array 125, and a tape library 140, all of which can be communicatively coupled via a network 150.

Consistent with various embodiments, the host device 102 can be a computer system. For example, the host device 102 can be a laptop computer, personal computer (PC), desktop computer, personal digital assistant (PDA), smart phone, web server, mobile computing device, or any other electronic device or computing system capable of processing programming instructions and receiving and transmitting data. In some embodiments, host device 102 can be a virtual computing device of a computing system utilizing multiple computers as a server system, such as in a cloud computing environment. In some embodiments, host device 102 represents an access point to a computing system utilizing clustered computers and components (e.g., database server computers, application server computers, etc.) that act as a single pool of seamless resources when accessed.

The storage array 125 can include one or more storage devices installed on host device 102 or external to the host device 102 and accessible via network 150. In embodiments, storage array 125 can include hard disk drives (HDD), solid state drives (SSD), USB storage devices, and/or any other suitable block storage devices. In embodiments, the storage device may be coupled to a hierarchical storage management (HSM) system (not shown) and accessible in storage tiers. In embodiments, storage array 125 is a RAID (Redundant Array of Independent Disks) based storage system.

The tape library 140 can include one or more tapes. As depicted in FIG. 1, tape library 140 includes a first tape (Tape 1) 130 and a second tape (Tape 2) 135, and may include one or more additional tapes (Tape N). However, in some embodiments, tape library 140 may only include a single tape. Logical data types on each tape include data records (REC), file marks (FM), and an end-of-data (EOD) (to be further discussed with reference to FIGS. 2A and 2B). Tape library 140 is an automated tape storage device that includes a plurality of tape drives for writing to and reading from tape media, such as single-reel or two-reel magnetic tape cartridges. In embodiments, tape library 140 is an IBM TS3400™ Tape Library or an IBM TS3500™ Tape Library. While reference is made to IBM-specific hardware and/or software components, it should be understood that aspects may be applied equally to other tape library technologies. In embodiments, tape library 140 includes a plurality of tape media stored in banks or groups of storage slots. For example, tape media may include, but is not limited to magnetic tape cartridges, magnetic tape cassettes, and optical tape cartridges. Tape library 140 can further include a plurality of slots to hold tape cartridges, a barcode reader to identify tape cartridges, and an automated method (e.g., a robot) for loading tapes.

In embodiments, network 150 can be a telecommunications network, a local area network (LAN), a wide area network (WAN), such as the Internet, or a combination thereof, and can include wired, wireless, or fiber optic connections. In embodiments, network 150 is a storage area network ("SAN"). Network 150 provides block-level network access to storage, such as storage array 125 and tape library 140. Network 150 may include one or more wired and/or wireless networks that are capable of receiving and transmitting data, audio, and/or video signals, including multimedia signals that include audio, data, and video information. In general, network 150 may be any combination of connections and protocols that will support communications between host device 102, storage array 125, tape library 140, and other computing devices (not shown) within computing environment 100.

Figure 3:
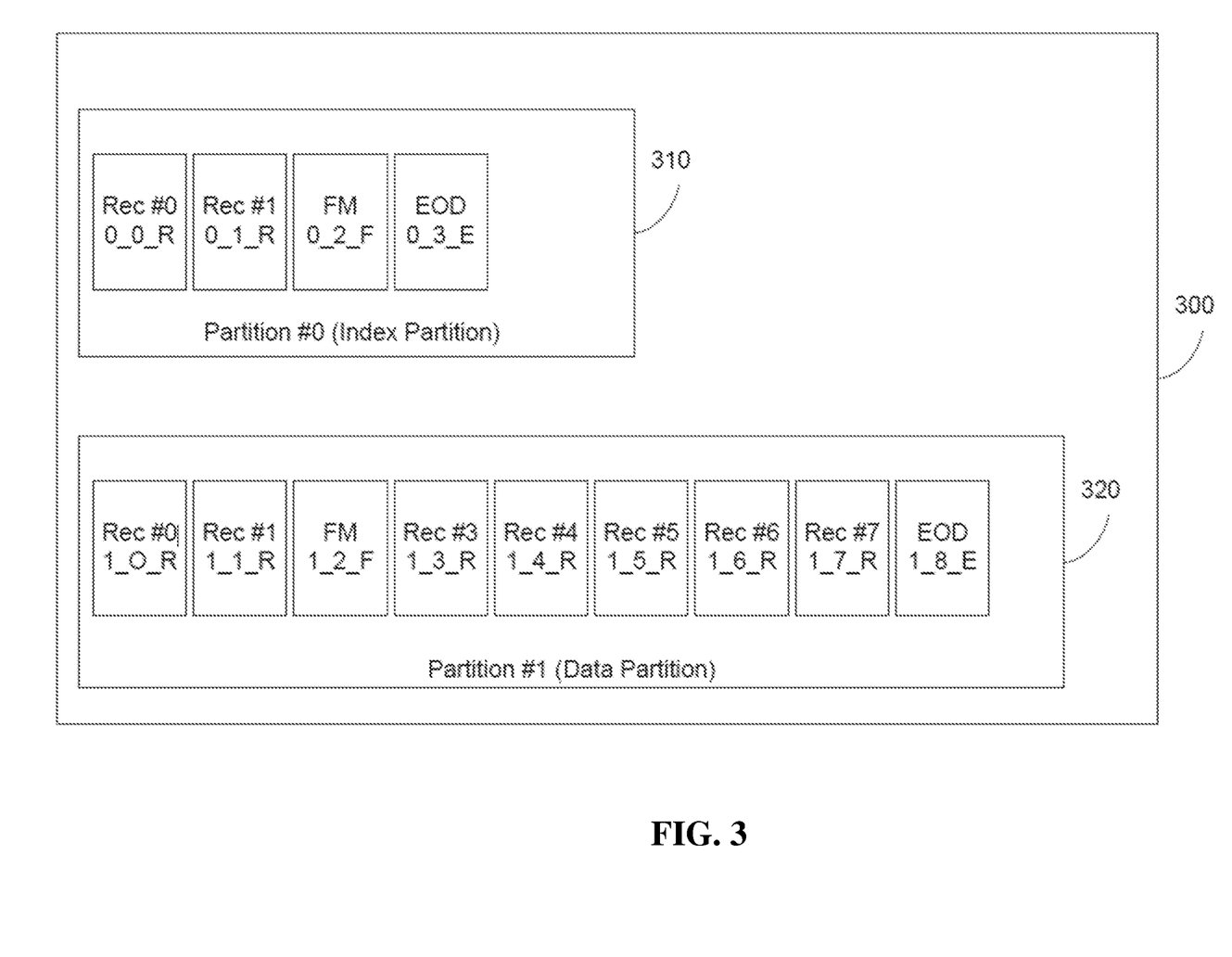
FIG. 3 is a block diagram illustrating an example tape image, in accordance with embodiments of the present disclosure.

Host device 102 includes linear tape file system (LTFS) 115. LTFS 115 is a file system that allows files stored on tape media to be accessed in a similar fashion to files stored on a hard disk or flash drive. For example, LTFS 115 can be an IBM Linear Tape File System—Library Edition (LTFS-LE) that allows LTFS volumes (i.e., tape media) to be used with a tape library, such as tape library 140. While reference is made to IBM-specific hardware and/or software components, it should be understood that aspects may be applied equally to other virtual tape library technologies. Each LTFS-formatted tape media in tape library 140 appears as a separate folder under the file system mount point. An exemplary portion of a tape image is illustrated in FIG. 3.

Although in FIG. 1 LTFS 115 is depicted as being integrated with host device 102, in alternative embodiments, LTFS 115 is remotely located from host device 102. In embodiments, LTFS 115 is integrated with storage array 125. In embodiments, LTFS 115 is integrated with the tape library 140.

LTFS 115 manages tape images. A tape image includes a pair of LTFS partitions—one Data Partition (DP) and one Index Partition (IP)—that contain a logical set of files and directories to the files. The term "file" as used herein shall refer to a group of logically related data extents together with associated file meta-data. The term "data extent" as used herein shall refer to a contiguous sequence of recorded blocks (i.e., a set of one or more sequential logical blocks used to store file data). In embodiments, a file is recorded as one or more extents and each extent corresponds to one or more records. In embodiments, all records within a data extent have a predetermined storage length (also known as the "block size"). In an embodiment, the default block size is 512 KB or 0.5 MB. However, it should be appreciated that the default block size may be any predetermined size.

In embodiments, the mapping from file byte offsets to block positions is maintained in the index partition of a tape image and is generally referred to as an extent list. Each entry in an extent list for a file encodes a range of bytes in the file as a range of contiguous bytes in a data extent. Each data extent included in the extent list can include the following information:
(i) Start Block—the block number within the data extent where the content for the extent begins;
(ii) Byte Offset—the number of bytes from the beginning of the start block to the beginning of the file data for the extent;
(iii) Byte Count—the number of bytes of file content in the data extent; and
(iv) File Offset—the number of bytes from the beginning of the file to the beginning of the file data recorded for the extent.

Storage array 125 can include a cloud or virtual data storage and backup system (e.g., a special storage device, group of devices, etc.) and software, firmware, etc., that has hierarchical storage management functionality, whereby data is migrated between tiered storage. For example, storage array 125 can include an IBM TS7720 Virtualization Engine (TS7720 VE™) or an IBM 7740 Virtualization Engine (TS7740 VE™). While reference is made to IBM-specific hardware and/or software components, it should be understood that aspects of the present disclosure may be applied equally to other virtual tape library technologies. In embodiments, storage array 125 migrates data between a primary, high-speed storage media, such as a hard disk, and a secondary, slower speed storage media, such as a magnetic tape.

Storage array 125 includes a first virtual tape image (IMG 1) and a second virtual tape image (IMG 2), and may include one or more additional virtual tape images (IMG N). Each virtual tape image includes an index partition (e.g., $IP_1$ and $IP_2$) and a data partition (e.g., $DP_1$ and $DP_2$).

In embodiments, host device 102 includes a tape drive emulation component (TDEC) 120, which is a data storage virtualization technology that utilizes storage components (an HDD) within the storage array 125 as tape libraries or tape drives for use with existing backup software. In embodiments, TDEC 120 converts input/output (I/O) requests directed to tape library 140 to storage array 125. For example, assume an application 105 operating on the host device 102 issues a write request for a record initially directed to be stored on a magnetic tape in tape library 140. A kernel 110 of the host device 102 then dispatches this request to the LTFS 115, and rather than directly writing the data to the tape media in the tape library 140, the TDEC 120 writes the data as a logical volume on a hard disk of the storage array 125.

In embodiments, storage array 125 receives read requests. Upon receiving a read request, storage array 125 determines whether the data is stored on a disk cache of a hard disk. If the requested data is stored as a logical volume on a disk cache of hard disk, the data is read from the disk cache. In some embodiments, if the requested data is stored on tape media (e.g., Tape 1) in tape library 140, storage array 125 loads the data from the tape media in tape library 140 to a disk cache of a hard disk of storage array 125, such that the data is read from the disk cache. In some embodiments, if the requested data is stored on tape media in tape library 140, storage array 125 may not load data from the tape media to a hard disk. Rather, the data can be read from the tape library 140.

In embodiments, duplexing of file data can be completed by copying data converted to a tape image (e.g., IMG 1) on a storage device of the storage array 125 onto a tape (e.g., Tape 1 of tape library 140). For example, a mirroring component 145 of the LTFS 115 can be configured to monitor differences between IMG 1 and Tape 1, and copy writes made to IMG 1 to Tape 1. Virtual tape images can be synchronized with respective tapes (e.g., IMG 1 can be synchronized with Tape 1, IMG 2 can be synchronized with Tape 2). In some embodiments, a determination is made to synchronize a particular virtual tape image with a respective tape based on a comparison between an end-of-data (EOD) position of the virtual tape image and the EOD position on the respective mirrored tape (e.g., by the mirroring component 145). For example, any newly appended data on the virtual tape image (which extends the EOD position on the tape image as compared to the EOD position on the tape) can be copied to the corresponding tape.

Each time a file is updated (e.g., deleted, modified, or overwritten) within a tape image of the storage array 125, the portion of the tape image which was updated becomes invalid (e.g., no longer referenced by the index partition). Thus, data fragmentation is particularly problematic within the storage array 125. As a result, when a large number of data areas on the hard disk become invalid, a reclaim process may need to be executed. Generally, in order to perform a reclaim process, valid files referenced by the index partition of a tape image stored on a first hard disk are copied and transferred to a second hard disk on a per LTFS file basis. Once the valid files have been transferred to a second, new hard disk, the first hard disk is reformatted. Here, the reclaim source is a tape image stored on the existing hard disk and the reclaim target is a second tape image stored on the new hard disk. However, this process is disadvantageous since an additional hard disk is tied up in order to perform the reclaim process.

To address this issue, the LTFS 115 includes an invalid area recorder 155 configured to determine, after each time a file is updated within the storage array 125, a location (e.g., position) and length of the invalid data area. The invalid area recorder 155 can store the positions and lengths of invalid areas within tape images in invalid area lists ($IA_1$ and $IA_2$) within each respective tape image. For example, if an update is made to IMG 1, invalid area recorder 155 can be configured to store the positions and lengths of the invalid areas within invalid area list 1 $IA_1$ of IMG 1. However, invalid area recorder 155 can be configured to store invalid area lists in any other suitable location (e.g., within memory of the host device 102, within memory of another device, within the tape library 140, etc.). Further, invalid area recorder 155 can be located (e.g., installed) in any other suitable location (e.g., within storage array 125 or another computing device).

The invalid area lists can be used to free up memory (occupied by invalid areas) within the storage array 125 without executing a reclaim process. For example, after synchronization occurs between the storage array 125 virtual tape images IMG 1, IMG 2 . . . IMG N and the respective mirrored tapes Tape 1, Tape 2 . . . Tape N, the areas recorded within the recorded area lists $IA_1$, $IA_2$ . . . $IA_N$ can be released. After the invalid areas are released within the virtual tape images IMG 1 and IMG 2, then the invalid area lists $IA_1$ and $IA_2$ can be cleared. In some embodiments, invalid areas can be recorded by referencing an extent list (e.g., the start block, byte offset, and byte count of each respective file).

While the free space within the storage array 125 is increased (by releasing the invalid areas), the invalid areas on the tape are not freed up. This is because data can only be appended on the end of each tape. As such, the areas in which data is deleted cannot be used for future data storage. Accordingly, after releasing occurs, the EOD position in the tape image can eventually extend beyond the end of the tape (e.g., the size of data written on the virtual tape image exceeds the capacity of the tape). If this occurs, synchronization between the storage array 125 and tape library 140 cannot continue. To address this issue, in embodiments when the EOD position in the tape image exceeds the end of the tape, the data in the file is written to a new tape image and the new tape image is copied to a new tape. In these embodiments, when an overwrite of a file in the old tape image occurs, all the data in the file is written to a new tape image, such that the data in the file does not extend across multiple tape images.

As a detailed example, assume a file, "File X," is modified within IMG 1 on the storage array 125. The position and length of File X (e.g., in terms of start block, byte count, and byte offset, see FIG. 4 for more detail) is recorded and saved in $IA_1$. The modified version of File X is then appended to IMG 1. An attempt is then made to synchronize IMG 1 with Tape 1. A determination is made that appending File X onto IMG 1 exceeds beyond the end of the tape. Thus, there is no room on the tape for File X. In this instance, File X is saved to a new tape image, for example IMG 2. IMG 2 is then mirrored to a new tape, for example, tape 2. In this example, though multiple images exist within the same hard disk, the files can still be accessed as if they were within a single file system using various methods known in the art. For example, directories of separate file systems can be overlaid using a tool such as UnionFS.

The techniques described allow invalid areas within the storage array 125 to be freed up without performing reclamation. Further, since redundant data is not held on multiple tapes, the time and space on tapes for copying can be saved. Rollback capability is still possible for the tape because invalid data areas remain on the tape.

FIG. 2A is a block diagram illustrating an example of a tape media 200A, stored in tape library 140, in accordance with embodiments of the present disclosure. Unlike a read/write command for a block device, such as a hard disk, a read/write command issued to a tape drive does not specify a block number. In embodiments, the position of data corresponding to a read/write request is determined based on the current position of the tape with respect to the tape head. The current position of the tape is retrievable by issuing a "Read Position" command. Similarly, the position of the tape can be set to any position by issuing a "Locate/Space" command. When a read/write command is successfully executed, the current position of the tape is updated.

In embodiments, data written to tape media stored in a tape library (e.g., tape library 140 of FIG. 1) includes the following information: (i) record, (ii) file mark ("FM"), and (iii) end of data ("EOD") mark. The term "record" as used herein shall refer to a variable length data sequence on a tape media. The term "file mark" as used herein shall refer to a zero-length separator on a tape media that delimits data (i.e., records) to a particular file. The term "end of data mark" as used herein shall refer to a designation of the end of the data written to a tape media.

As depicted by FIG. 2A, tape media 200A includes Position 0, Position 1, Position 2, Position 3, Position 4, Position 5, Position 6, and Position 7. Positions 0-7 demarcate physical units of data (i.e., data blocks) on tape media 200A. In embodiments of the disclosure, blocks can include a single record, part of a record, or multiple records. In some embodiments, data blocks are fixed in size. In some embodiments, data blocks are variable in size. Tape media 200A further includes: Rec #0, Rec #1, Rec #3, Rec #4, Rec #5, and Rec #6. Records 0 and 1 belong to the same file, as indicated by the file mark at position 2. Records 3-6 belong to the same file, and record 6 is the end of the data (as indicated by end of data (EOD) mark located at position 6) written to tape media 200A. In embodiments, when a "READ" command is issued, the current position of the tape head is updated. For example, if the current position of the tape is at position 3 and a "READ" command is issued, record 3 will be read, and the current position is updated to position 4.

FIG. 2B is a block diagram illustrating an example of a tape media 200B, stored in a tape library (e.g., tape library 140 of FIG. 1) in accordance embodiments of the present disclosure. Tape media 200B illustrates tape media 200A of FIG. 2A after a "WRITE" request is received by a tape drive of the tape library. In embodiments, a "WRITE" request is issued for one or more of the following: (i) modifying a record, (ii) overwriting a record, and (iii) adding new data. Tape media 200B includes Position 0, Position 1, Position 2, Position 3, Position 4, Position 5, Position 6, Position 7, and Position 8. Here, positions 0-7 on tape media 200B correspond to positions 0-7 on tape media 200A. Tape media 200B further includes: Rec #0, Rec #1, Rec #3, Rec #4, Rec #5, Rec #6, and Rec #7. Here, records 0-6 on tape media 200B correspond to records 0-6 on tape media 200A. In embodiments, "WRITE" operations append data to the end of the tape media 200B. As depicted by tape media 200B, a "WRITE" request has been issued. Accordingly, since record 6 was the last record written to tape media 200A (at position 6), record 7 is written at position 7 on tape media 200B and the end of the data (EOD) mark is updated to position 8.

FIG. 3 is a block diagram illustrating an example tape image 300, in accordance with embodiments of the present disclosure. As depicted in FIG. 3, tape image 300 corresponds to the data stored on tape media 200B in FIG. 2B. In some embodiments, tape image 300 is stored on a first storage device, such as a first hard disk in a storage array (e.g., storage array 125 of FIG. 1). In some embodiments, a directory in an LTFS is regarded as one volume of tape. In some embodiments, tape image 300 stores data files and corresponding metadata to completely describe the directories and file structures stored on tape image 300. Tape image 300 includes a pair of LTFS partitions: (i) index partition 310, and (ii) data partition 320, that include a logical set of files and directories, respectively.

In embodiments, a tape drive emulation component (e.g., TDEC 120 of FIG. 1) converts file data from an application initiating a read or write input/output command to a tape library to tape image 300 stored on a storage device of a storage array. The tape drive emulation component converts file data, which includes the following attributes: (i) a data record (i.e., record #), (ii) a file mark (FM), and (iii) an end of data (EOD) mark. Each data type is recorded by writing file data within an LTFS partition of a storage device (e.g., an HDD or SSD). In embodiments, the tape drive emulation component converts the file data into the following LTFS file format: [partition] [record number] [record type]. The partition identifies the directory to which the data is written and the record number and record type (R=Record, F=file mark, and E=end of data mark) identifies the particular file and file content, respectively. For example, 0_500_R indicates a file being located at partition "0," having a record number "500," of which the type of record is a data record. In another example, 1_300_F indicates a file located at partition 1, having a record number "300," of which the type of record is a file mark. In yet another example, 1_5000_E indicates a file being located at partition "1," having a record number "5000," of which the type of record is an end of data mark.

Figure 4:
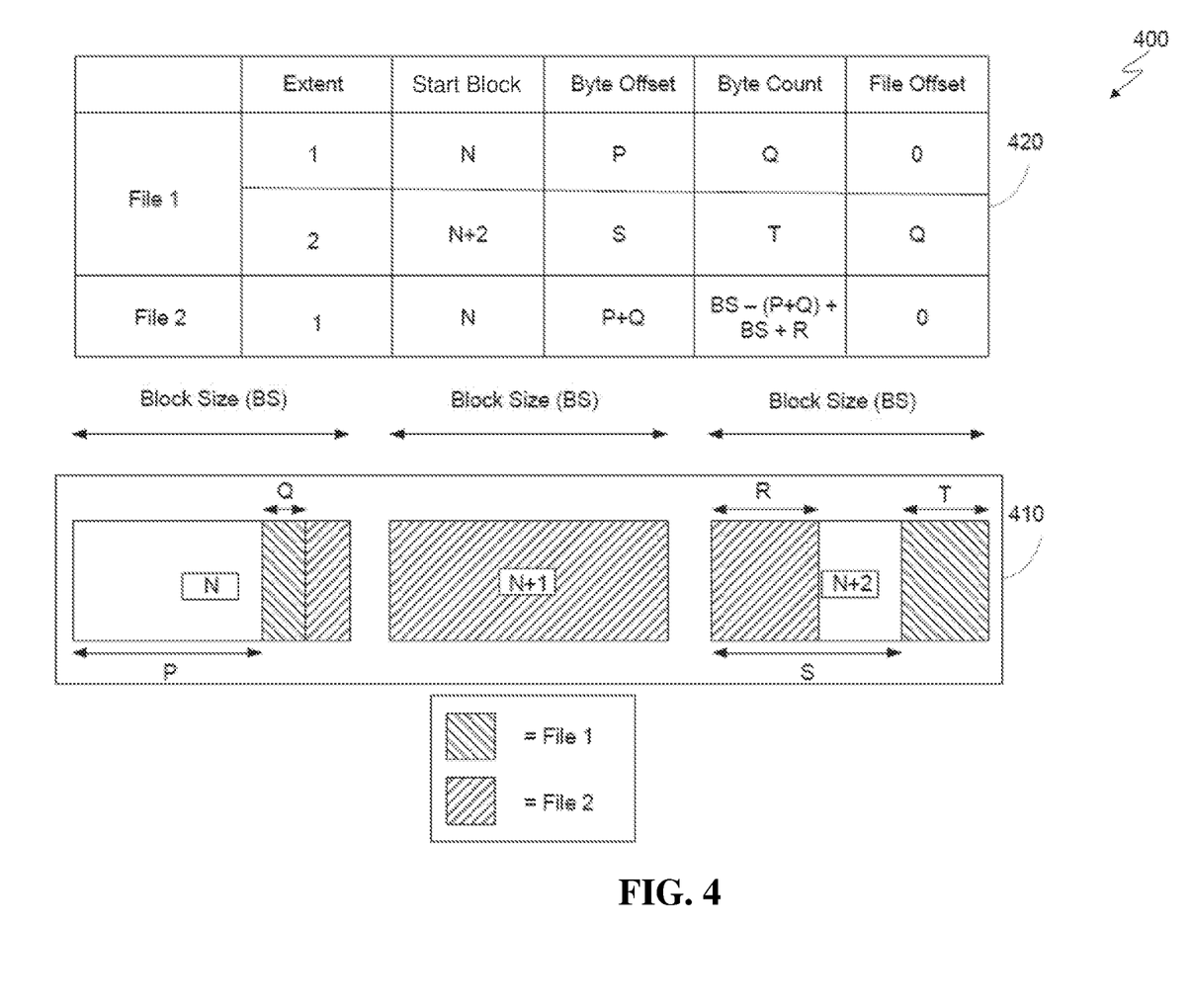
FIG. 4 is a block diagram illustrating an example of file data stored on an LTFS-formatted storage media, in accordance with embodiments of the present disclosure.

FIG. 4 is a block diagram illustrating an example of file data stored on a LTFS-formatted storage media, generally designated 400, in accordance with embodiments of the present disclosure. In some embodiments, file data is stored on tape media (e.g., Tape 1 of FIG. 1) of a tape library (e.g., tape library 140 of FIG. 1). In some embodiments, file data is stored on a storage device (e.g., an HDD or SSD) of a storage array (e.g., storage array 140 of FIG. 1). In embodiments, the position and length of the data in the file is managed as a collection of extents. FIG. 4 includes storage device 410, which includes three data blocks: N, N+1, and N+2. Each of data blocks N, N+1, and N+2 have a block size (B S), and are sequentially located on storage device 410.

FIG. 4 further includes extent list 420. As depicted by extent list 420, the mapping from file byte offsets to block positions is depicted by data blocks N, N+1, and N+2 of storage device 410. In embodiments, extent list 420 is maintained in the index partition of a tape image. In embodiments, storage information, such as information included in extent list 420, is retained and accessed by an LTFS. For example, an invalid area recorded (e.g., invalid area recorder 155 of FIG. 1) of an LTFS (e.g., LTFS 115 of FIG. 1) can be configured to access the extent list 420 to record the block positions and lengths of invalid data areas (e.g., invalid extents).

Extent list 420 includes the following information with respect to the file data stored on data blocks N, N+1, and N+2 of storage device 410: (i) file number, (ii) extent number, (iii) start block, (iv) byte offset (i.e., the data offset within a record), (v) byte count, and (vi) file offset (i.e., the data offset within a file). In embodiments, the index partition of a tape image of LTFS-formatted data is modified to include a file offset. Accordingly, in embodiments, file data can be converted into to the following file format: [partition] [record number] [record type] [byte offset]. For example, a file name 1_500_R 200 indicates that a file has a record located in partition "1," having a record number "500," of which the data is located at an offset "200" of the record.

Extent 1 of File 1 is stored on block N and begins at byte offset P, which is a number of bytes from the beginning of block N. The byte count or size of Extent 1 is designated by Q. The file offset of Extent 1 is 0, which indicates that the number of bytes from the beginning of the file to the beginning of the file data recorded in Extent 1 is 0. In other words, the data included in Extent 1 is the beginning of the file data of File 1.

Extent 2 of File 1 is stored on block N+2 and begins at byte offset S, which is a number of bytes from the beginning of block N+2. The byte count or size of Extent 2 is designated by T. The file offset of Extent 2 is Q, which indicates a number of bytes from the beginning of the file to the beginning of the file data recorded in Extent 2.

Extent 1 of File 2 is stored on block N and begins at byte offset P+Q, which is the total number of bytes calculated by summing byte offset P and byte count Q. The byte count or size of Extent 1 of File 2 is BS (block size) of Block N−(P+Q)+BS of block N+1+R. The file offset of Extent 1 of File 2 is 0, which indicates that a number of bytes from the beginning of the file to the beginning of the file data recorded in Extent 1 of File 2 is 0. In other words, the data included in Extent 1 of File 2 is the beginning of the file data of File 2.

Figure 5:
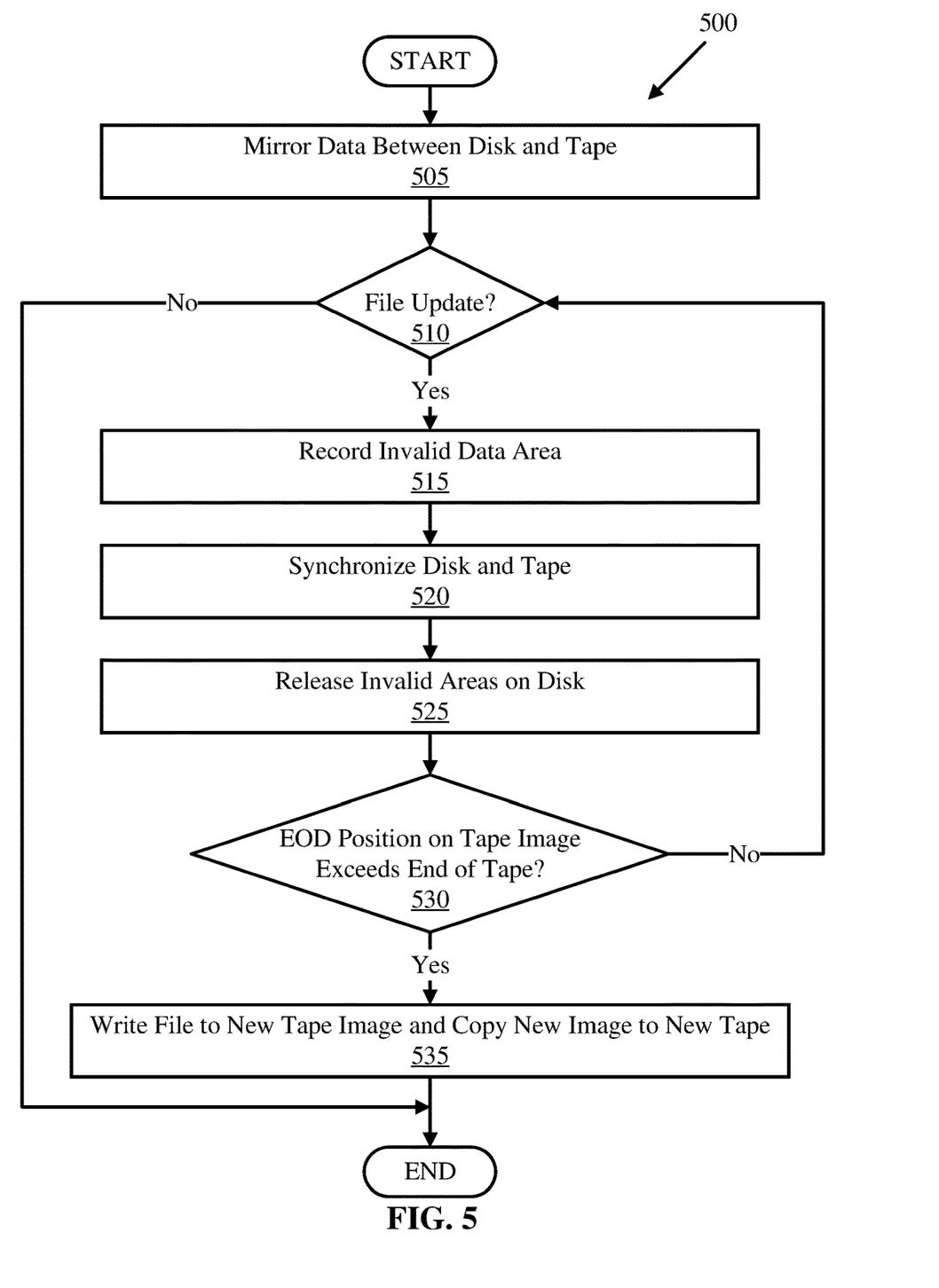
FIG. 5 is a flow diagram illustrating an example method for freeing space on a disk having a virtual tape image by recording and releasing invalid areas, in accordance with embodiments of the present disclosure.

Referring now to FIG. 5, shown is an example method 500 for freeing space on a storage disk by recording and releasing invalid areas, in accordance with embodiments of the present disclosure.

Method 500 initiates at operation 505, where mirroring between a disk (e.g., an HDD) and tape occurs. In embodiments, a mirroring component (e.g., mirroring component 145 of FIG. 1) can be configured to copy LTFS formatted data from a disk directly to a tape. Prior to mirroring, a tape drive emulation component (TDEC 120 of FIG. 1) can be configured to write the LTFS formatted data as a tape image to a disk.

A determination is then made whether a file is updated on the disk. This is illustrated at operation 510. Updates can include modification, overwriting, and/or deletion of files. The invalid areas on the disk as a result of the file update(s) are then recorded. This is illustrated at operation 515. As mentioned above, LTFS is a write-once system, such that if a file stored on one or more data blocks is modified, overwritten, or removed from a tape image, the associated data blocks are not freed up. Rather, the memory allocated to the associated data blocks becomes invalid (i.e., the associated data blocks are no longer referenced in the index). Accordingly, any files which were modified, overwritten, or removed on the tape image become invalid areas.

Recording the invalid areas can be completed by recording the start block, byte offset, and byte count of any updated files. Each invalid area can be stored in an invalid area list. The invalid area list can be located in any suitable location (e.g., on the disk or in memory of a device communicatively coupled to the disk).

The disk and tape are then synchronized. This is illustrated at operation 520. In embodiments, this can be completed by comparing the EOD of the tape image to the EOD on the tape and thereafter copying data between the position of the EOD on the tape and the position of the EOD on the tape image to the tape (e.g., by a mirroring component). In other words, any data newly appended to the EOD of the tape image (prior to synchronization) is copied to the tape. In some embodiments, mirroring may not be required, as the tape image and tape may already be synchronized. After the tape image and tape are synchronized, the invalid areas on the disk are released (e.g., deleted). That is, any files which represent records within the invalid area list are deleted. This is illustrated at operation 525. For example, the positions and lengths of each invalid data area in terms of start block, byte offset, and byte count are deleted from the disk.

A determination is then made whether the EOD position on the tape image (e.g., of the disk) exceeds the end of the tape. This is illustrated at operation 530. This can occur due to one or more additional writes to the disk (which may require to be synchronized with the tape). As previously mentioned, though releasing the invalid areas on the tape image frees up space on the disk, space is not freed on the tape (because the LTFS is a write-once system where data is always appended to the end of the tape). Accordingly, if the EOD position on the tape image exceeds the end of the tape, then the available capacity of the tape is exceeded, and synchronization cannot occur.

If a determination is made that the EOD position on the tape image does not exceed the end of the tape, then method 500 returns to operation 510, where an additional file update is received. Thus, method 500 may continuously loop between operations 510 and 530 until the EOD position on the tape image exceeds the end of the tape.

If a determination is made that the EOD position on the tape image exceeds the end of the tape, then the data in the file (e.g., the updated file) is written to a new tape image. The new tape image is then mirrored to a new tape. This is illustrated at operation 535.

The aforementioned operations can be completed in any order and are not limited to those described. Additionally, some, all, or none of the aforementioned operations can be completed, while still remaining within the spirit and scope of the present disclosure.

Figure 6:
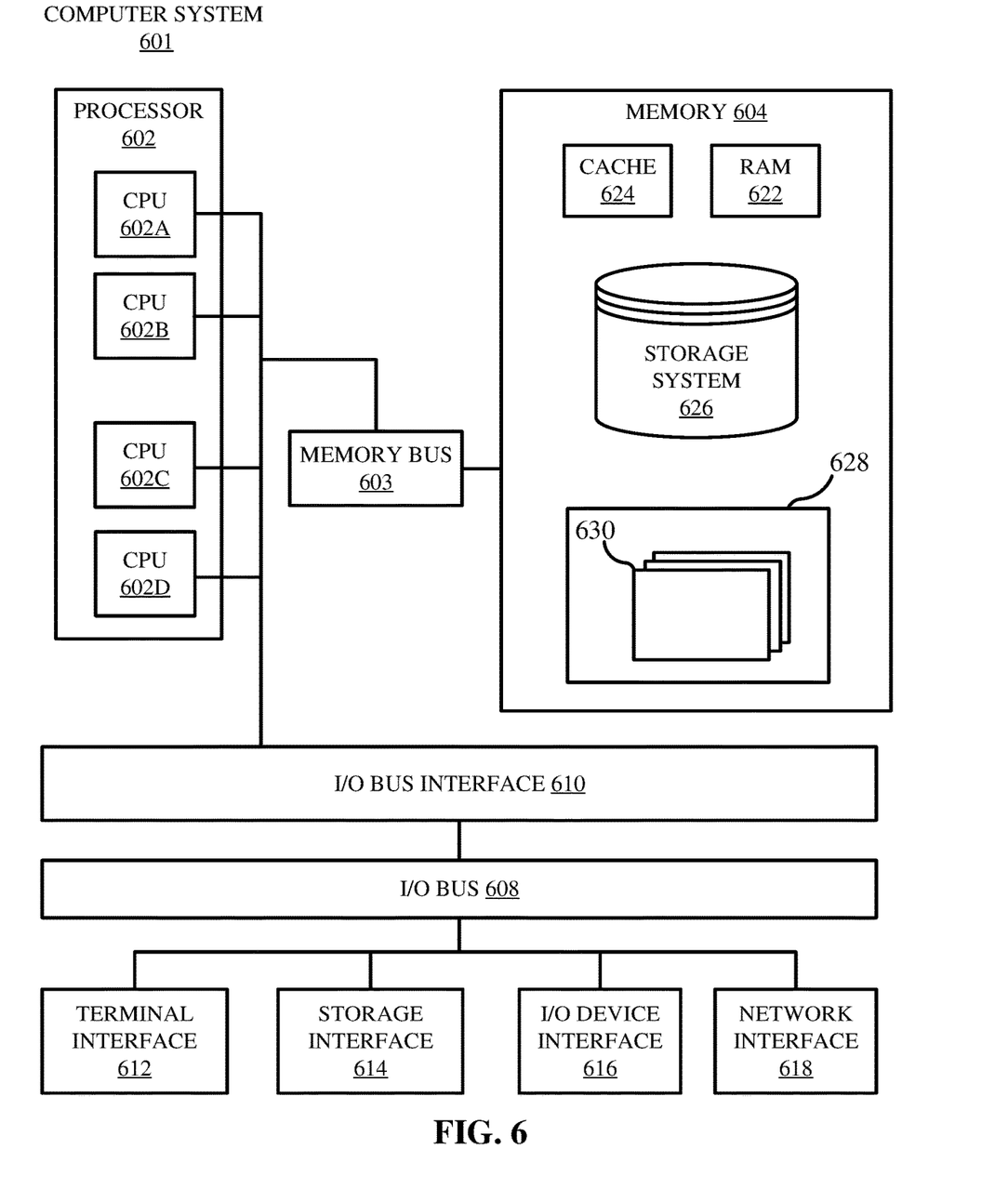
FIG. 6 is a high-level block diagram illustrating an example computer system that may be used in implementing one or more of the methods, tools, and modules, and any related functions, described herein, in accordance with embodiments of the present disclosure.

Referring now to FIG. 6, shown is a high-level block diagram of an example computer system 601 (e.g., host device 102) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 614, an I/O (Input/Output) device interface 616, and a network interface 618, all of which may be communicatively coupled, directly or indirectly, for inter-component communication via a memory bus 603, an I/O bus 608, and an I/O bus interface unit 610.

The computer system 601 may contain one or more general-purpose programmable central processing units (CPUs) 602A, 602B, 602C, and 602D, herein generically referred to as the CPU 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may include one or more levels of on-board cache.

System memory 604 may include computer system readable media in the form of volatile memory, such as random access memory (RAM) 622 or cache memory 624. Computer system 601 may further include other removable/non-removable, volatile/non-volatile computer system storage media. By way of example only, storage system 626 can be provided for reading from and writing to a non-removable, non-volatile magnetic media, such as a "hard-drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

In some embodiments, the program modules 630 of the computer system 601 may include a disk management module. The disk management module may be configured to receive an update to a file stored in a virtual tape image. The disk management module can further be configured to record the position and length of the file which was updated as an invalid area. The disk management module can then be configured to synchronize the virtual tape image with a tape, and subsequently release the invalid area from the virtual tape image.

Although the memory bus 603 is shown in FIG. 6 as a single bus structure providing a direct communication path among the CPUs 602, the memory subsystem 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 601 may, in some embodiments, contain multiple I/O bus interface units 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. A method comprising:
   receiving an update to a file stored on a virtual tape image;
   recording a position and length of the file as an invalid data area;
   synchronizing the virtual tape image with a tape; and
   releasing the invalid data area from the virtual tape image.

2. The method of claim 1, wherein the position and length of the file is recorded in terms of start block, byte offset, and byte count.

3. The method of claim 1, wherein the virtual tape image is synchronized with the tape by a mirroring component.

4. The method of claim 3, wherein the mirroring component synchronizes the virtual tape image and the tape by comparing an end-of-data (EOD) position on the virtual tape image with an EOD position on the tape.

5. The method of claim 1, further comprising:
   writing a second file to the virtual tape image;
   determining, as a result of the writing of the second file to the virtual tape image, whether an end-of-data (EOD) position on the virtual tape image exceeds an end of tape; and
   writing, in response to determining that the EOD position on the virtual tape image exceeds the end of tape, the second file to a second virtual tape image.

6. The method of claim 5, further comprising mirroring the second virtual tape image to a second tape.

7. The method of claim 1, wherein the invalid data area is stored in an invalid data area list on a hard disk that the virtual tape image is stored on.

8. A system comprising:
   a hard disk having a virtual tape image;
   a tape library having a tape; and
   a processor communicatively coupled to the hard disk and tape library configured to perform a method comprising:
      receiving an update to a file stored on the virtual tape image;
      recording a position and length of the file as an invalid data area;
      synchronizing the virtual tape image with the tape; and
      releasing the invalid data area from the virtual tape image.

9. The system of claim 8, wherein the position and length of the file is recorded in terms of start block, byte offset, and byte count.

10. The system of claim 8, wherein the virtual tape image and the tape are synchronized by comparing an end-of-data (EOD) position on the virtual tape image with an EOD position on the tape.

11. The system of claim 8, wherein the method performed by the processor further comprises:
   writing a second file to the virtual tape image;
   determining, as a result of the writing of the second file to the virtual tape image, whether an end-of-data (EOD) position on the virtual tape image exceeds an end of tape; and
   writing, in response to determining that the EOD position on the virtual tape image exceeds the end of tape, the second file to a second virtual tape image.

12. The system of claim 11, wherein the tape library further comprises a second tape, and wherein the method performed by the processor further comprises mirroring the second virtual tape image to a second tape.

13. The system of claim 8, wherein the invalid data area is stored in an invalid data area list on the hard disk.

14. A computer program product comprising a computer-readable storage medium having program instructions embodied therewith, the program instructions executable by a processor to cause the processor to perform a method comprising:
   receiving an update to a file stored on a virtual tape image;
   recording a position and length of the file as an invalid data area;
   synchronizing the virtual tape image with a tape; and
   releasing the invalid data area from the virtual tape image.

15. The computer program product of claim 14, wherein the position and length of the file is recorded in terms of start block, byte offset, and byte count.

16. The computer program product of claim 14, wherein the virtual tape image is synchronized with the tape by a mirroring component.

17. The computer program product of claim 16, wherein the mirroring component synchronizes the virtual tape image and the tape by comparing an end-of-data (EOD) position on the virtual tape image with an EOD position on the tape.

18. The computer program product of claim 14, wherein the method performed by the processor further comprises:
   writing a second file to the virtual tape image;
   determining, as a result of the writing of the second file to the virtual tape image, whether an end-of-data (EOD) position on the virtual tape image exceeds an end of tape; and
   writing, in response to determining that the EOD position on the virtual tape image exceeds the end of tape, the second file to a second virtual tape image.

19. The computer program product of claim 18, wherein the method performed by the processor further comprises mirroring the second virtual tape image to a second tape.

20. The computer program product of claim 14, wherein the invalid data area is stored in an invalid data area list on a hard disk that the virtual tape image is stored on.

* * * * *